United States Patent [19]
Federici et al.

[11] Patent Number: 5,280,383
[45] Date of Patent: Jan. 18, 1994

[54] DUAL-STAGE LOW POWER OPTICAL AMPLIFIER

[75] Inventors: John F. Federici, Somerset; Stuart A. Kramer, Fair Lawn, both of N.J.; Gerald Nykolak, Brooklyn, N.Y.

[73] Assignee: AT&T Bell Laboratories, Murray Hill, N.J.

[21] Appl. No.: 894,621

[22] Filed: Dec. 2, 1992

[51] Int. Cl.$^5$ ............................ H01S 3/30; G02C 6/26
[52] U.S. Cl. .............................. 359/341; 372/6; 359/344
[58] Field of Search ................ 359/341, 344; 385/122; 372/6

[56] References Cited

U.S. PATENT DOCUMENTS

| | | | |
|---|---|---|---|
| 5,050,949 | 9/1991 | Giovanni et al. | 359/341 |
| 5,117,303 | 5/1992 | Desurvire et al. | 359/341 |
| 5,177,634 | 1/1993 | Way | 359/341 |

OTHER PUBLICATIONS

Yamamoto et al., Opt. Quantum Electronics, vol. 21, spec. issue, pp. 75-88, 1989; abstract only provided.
Masuda et al., Electronics Letters, vol. 10, May 1, 1990, pp. 26-27.
Smart et al., IEEE Photonics Techn. Lett., vol. 4, #11, pp. 1261-1264, Nov. 1992; abst. only provided.
Righetti et al., Proc. ECOC, 1989, PDA-10, pp. 42-46.

*Primary Examiner*—Nelson Moskowitz
*Attorney, Agent, or Firm*—Charles E. Graves

[57] ABSTRACT

A two-stage optical fiber amplifier requiring substantially reduced power comprises a pre-amplifier first-stage operating in the linear region within the small signal limits, and a post-amplifier second-stage operating in a saturated regime providing significant gain compression. The pump power for the pre-amp stage is minimized, and all of the gain compression occurs in the second stage. Minimum pump power and the corresponding amplifier fiber length needed to achieve a predetermined optimum amount of small signal gain required in a given amplifier application may be achieved in variations of the design.

6 Claims, 4 Drawing Sheets

DUAL-STAGE LOW POWER OPTICAL AMPLIFIER

FIELD OF THE INVENTION

This invention relates to optical fiber amplifiers and, particularly, to a multi-stage optical fiber amplifier.

BACKGROUND OF THE INVENTION

Optically amplified transmission systems offer important advantages over current optical fiber transmission systems using electrooptic regenerators which include higher bit rate capability and multichannel transmission via wavelength division multiplexing. The optical fiber amplifiers previously have been configured in two stages for the purpose of achieving both high gain and high signal output power. An example of a single-stage optical amplifier is disclosed in U.S. Pat. No. 5,050,949, issued Sep. 24, 1991, and assigned to Applicants' assignee. An example of a prior art two-stage optical fiber amplifier design is disclosed in the article "High Gain Two-Stage Amplification with Erbimum-doped Fibre Amplification" by Masuda and Takada in *Electronics Lett.* 26, 661 (1990).

In these prior art teachings, minimizing the pump power of the optical fiber amplifier typically is not of concern because of the availability of continuous and adequate power. Minimizing pump power and at the same time maintaining sufficiently high gain and signal output is critical, however, to several important applications of optical fiber amplifiers. Battery-powered short-haul underwater telecommunications systems and data communications systems internal to automotive vehicles are two such instances.

In attempting to adapt a conventional two-stage optical fiber amplifier to a system with a low power requirement, simply lowering the pump power substantially sacrifices performance. Thus, prior art two-stage optical fiber amplifiers and single-stage amplifiers as well do not suffice where a substantially reduced pump power requirement must be met.

SUMMARY OF THE INVENTION

An optical fiber amplifier operating on substantially reduced power, in accordance with the invention, comprises a pre-amplifier first stage which operates nominally in the linear region of its small signal or unsaturated gain regime and a post-amplifier second stage which operates in a saturated regime with significant gain compression. An interstage isolator prevents a backward ASE from saturating the first stage. An interstage bandpass filter reduces the amount of forward ASE. By operating the pre-amp stage in the small signal range, the minimum pump power and the corresponding amplifier fiber length needed to achieve a predetermined optimum amount of small signal gain can readily be determined. Thus, the pump power for the pre-amp stage is minimized and all of the gain compression occurs in the second stage. As a consequence, pump power needs are much reduced without appreciable sacrifice of performance potential for many applications.

DETAILED DESCRIPTION OF AN ILLUSTRATIVE EMBODIMENT

Figure 1:
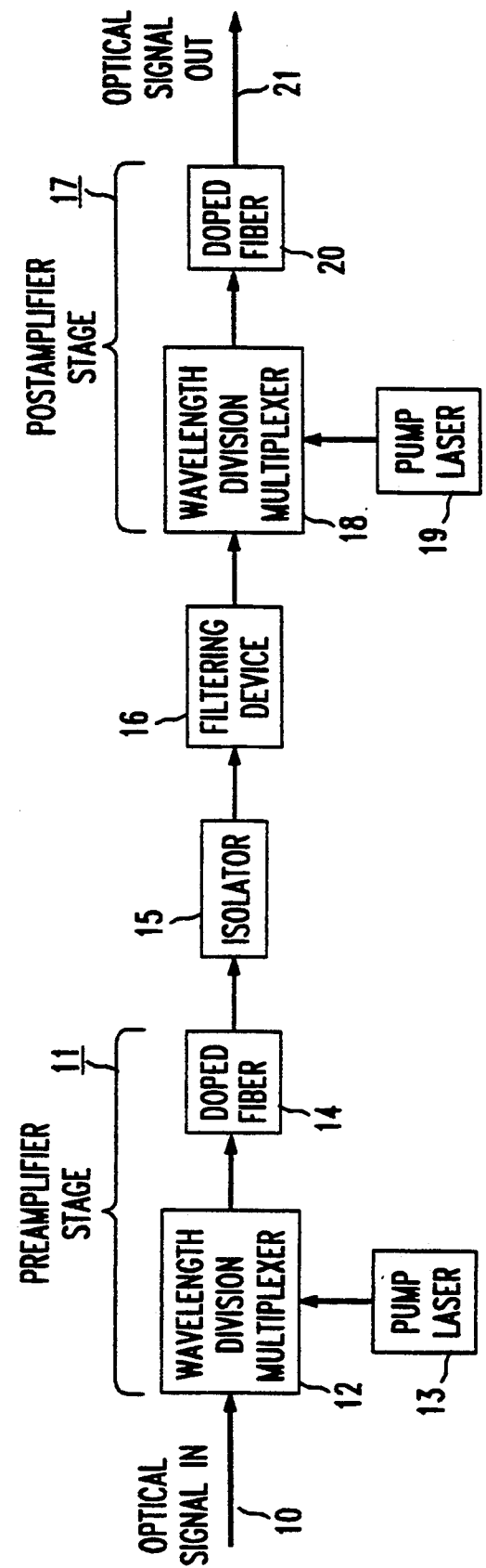
FIG. 1 is a schematic diagram of an illustrative two-stage optical fiber amplifier design incorporating the invention.

As seen in FIG. 1, an optical signal 10 feeds into a preamplifier stage 11. Stage 11 comprises a wavelength division multiplexer 12 where the output of a conventional pump laser 13 combines with signal 10. Laser 13 may, for example, be a multi-quantum well laser operating at 980 nm. The output of multiplexer 12 is fed to a first length of erbium-doped optical fiber. First stage 11 operates within a small signal or unsaturated portion of its regime to provide pre-amplification. The gain of first stage must be set to a value within its small signal gain regime, which may be in the range of from 20 dB to 36 dB. Most of the gain is achieved in the first stage, with the second stage driving the overall optical fiber amplifier into the desired amount of gain saturation.

The output from fiber 14 is fed to isolator 15 which in accordance with one aspect of the invention significantly reduces backward-amplified spontaneous emission (ASE) buildup, while permitting the propagation of the signal and ASE in the forward direction. Isolator 15 reduces the required power of pump laser 13 since the isolator suppresses the buildup of ASE in the overall amplifier, enabling the desired incoming signal 10 rather than the spontaneous emission to be amplified. Persons skilled in the art will recognize that other components or designs will, in accordance with the invention, provide functionalities equivalent to those of the discrete isolator component 15 in the instant illustration.

Further in accordance with the invention, a filtering device 16 receives the output of isolator 15. Device 15 may be, for example, a bandpass filter with a filter passband of substantially 10 nm, to somewhat further reduce the ASE noise and thus further reduce the required total pump power of lasers 13 and 19. By narrowing further the width of device 15 it is possible to reduce still further the noise passing to the post-amplifier 17 second stage; however, the amplifier may become increasingly less tolerant of frequency variations which may occur in signal 10.

Second stage 17 provides post-amplification. This stage comprises wavelength division multiplexer 18 which receives the output of filter device 16 and combines it with a second pump signal from pump laser 19. The output of multiplexer 18 is fed to another length of erbium-doped optical fiber 20, resulting in output signal 21.

Amplifier fiber useful in practicing the present invention may be an alumina-germanium-silicate erbium doped fiber with a peak erbium absorption 8.15 dB/m and an index difference of 0.02. However, the invention does not require any particular design of optical fiber amplifier; and in fact a wide range of different dopants, concentrations and physical designs may be employed as elements 14 and 20, depending on the pump wavelength selection and the intended purpose of the overall amplifier.

The post-amplifier stage 17 in the instant illustration provides compressed gain of 30 dB, by running about 6 dB into compression in its region of saturation. In a chain of cascaded amplifiers and transmission fiber spans, this amount of gain compression is required for automatic gain control. Further, the approximately 30 dB amplifier gain provided, compensates for dispersion shifted transmission fiber loss. Additionally, the overall optical amplifier compensates very well for component losses. For shorter systems with fewer amplifiers, relatively more compression may be desirable.

Figure 2:
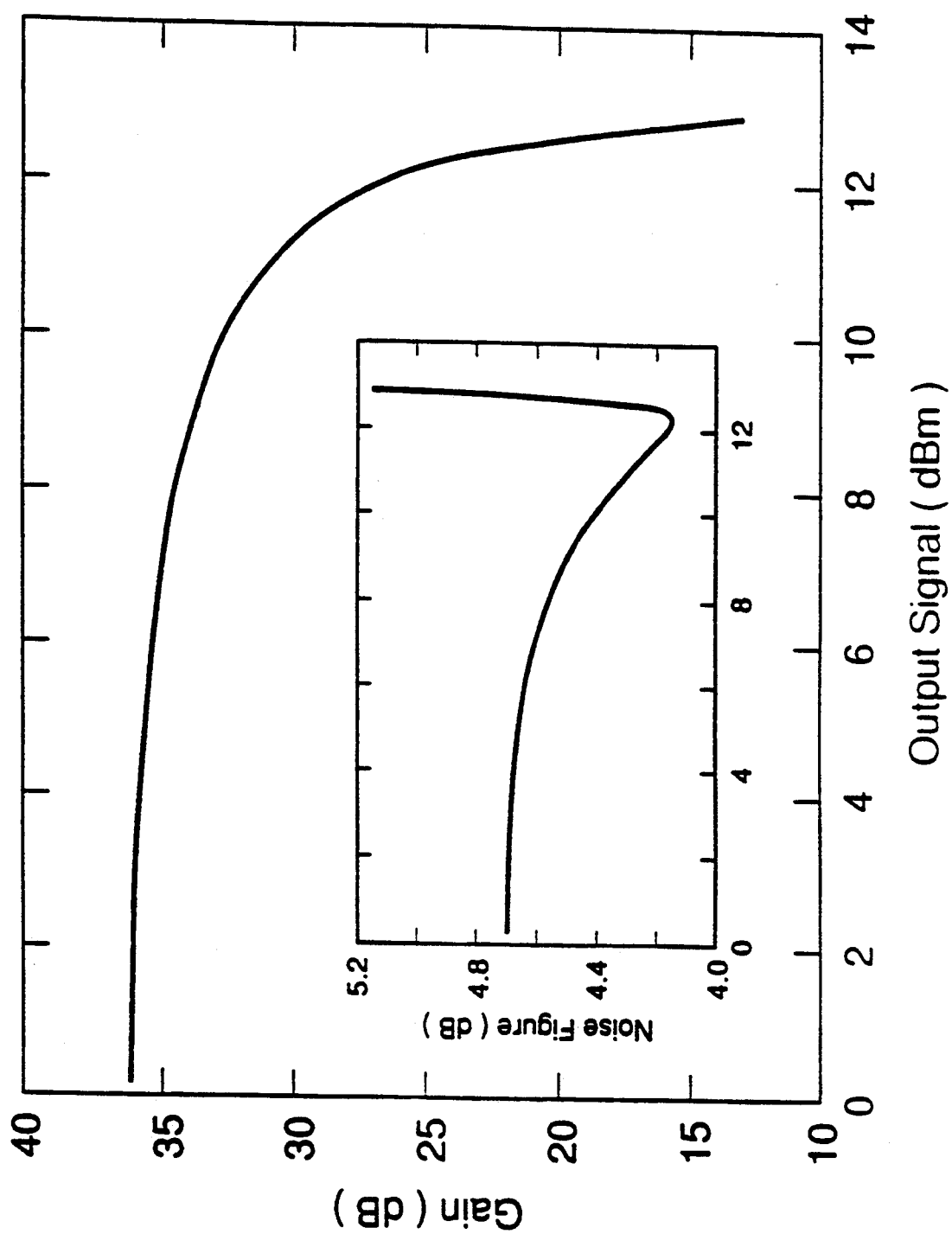
FIGS. 2, 3 and 4 are graphs showing gain and noise data for the prior art single stage design and for the present two stage design at two different pumping wavelengths.
Figure 3:
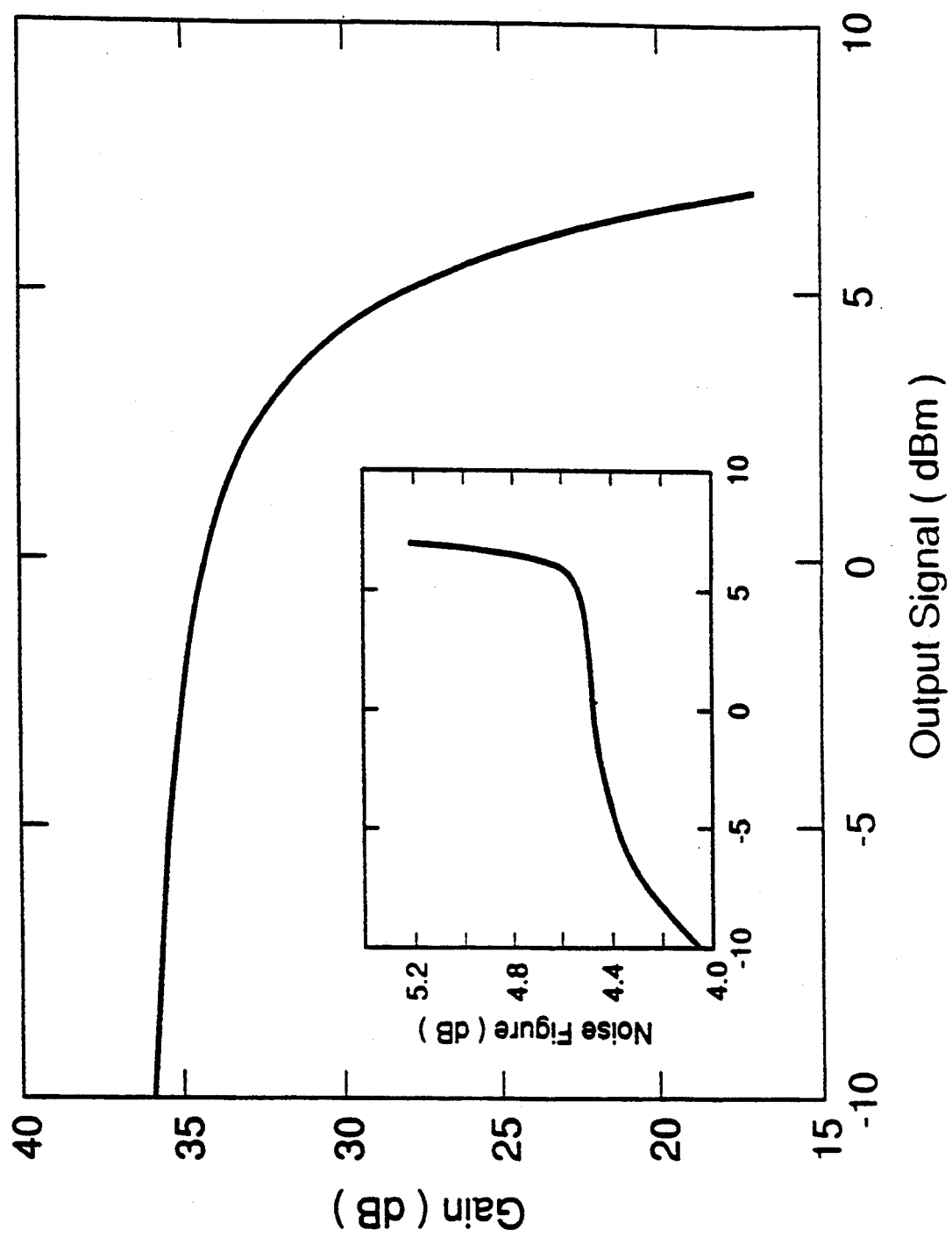
Figure 4:
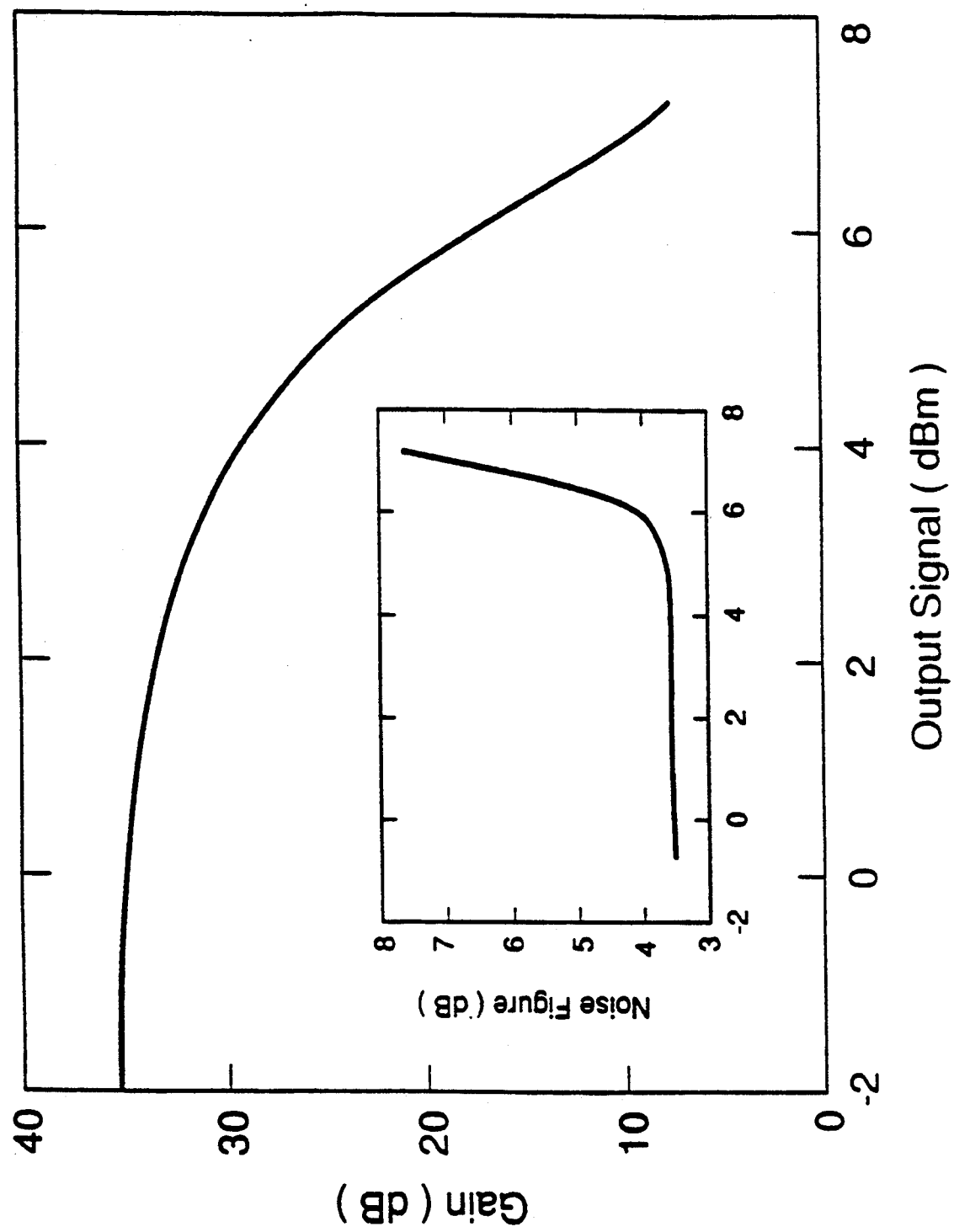

Both first stage 11 and second stage 17 may be co-directionally pumped with either 1480 or 980 nm light generated in pump lasers 13 and 19. The term "small signal range" as used herein connotes the relatively flat portions of the gain vs. output signal power curve of FIGS. 2, 3, and 4. Conventionally, saturated gain commences when the small signal gain falls by about 3 dB. In a single stage optical fiber amplifier, for example, one which uses only components denoted 11, 13 and 14 with a 1480 nm pump diode, the output signal reaches saturation at approximately 10 dBm with a pump power of about 45 milliwatts. The point is illustrated in FIG. 2. For the two-stage design of the instant invention, useful amounts of gain may still be realized as shown in FIGS. 3 and 4, with much less laser pump power requirement.

Generally, depending upon the desired amount of gain and output signal level for a given optical fiber amplifier, the minimum power rating of laser pumps 13 and 19 and the corresponding lengths of fibers 14 and 20 may readily be determined. Any significant increase or decrease in either the pump power or fiber length changes the overall signal gain below the specified value; in this example, the 30 dB overall gain of the amplifier.

Various pump wavelengths may be used in place of those mentioned, depending on the balance needed between high gain vs. minimizing total pump power requirement. Further, although the example shows use of two different pump laser components 13 and 19, a single pump laser may be used. Care must be taken to allocate or split the single source power appropriately, however; and some loss of reliability may also be experienced.

The two-stage amplifier requires substantially lower pump power, for example, 16.5 mW versus 45 mW. Realizing lower pump power requires only having to accept lower output power, for example, on the order of 4 dBm versus 11 dBm at 30 dB gain. A 980 nm two-stage design reduces the required pump power by a factor of seven. The two-stage design typically requires one-third (1480 nm pumping) to one-seventh (980 nm pumping) of the pump power of a comparable single stage amplifier.

The invention may be extended to three-, four- and five-stage optical amplifiers, and beyond if desired. Interestingly, however, it has been determined that the most significant reduction in required pump power which, as noted is approximately a factor of 3, occurs in going from a single-stage to a two-stage design. The limit of an infinite number of stages achieves only a factor of two in further savings of pump power over the savings of the two-stage design. Each added stage introduces additional optical components, adding to cost and complexity. Accordingly, for many purposes where pump power consumption must be sizably reduced but does not need to be absolutely minimized, the two-stage design is optimal.

The invention finds further uses in loss compensator/power boosters for 1×N splitters used in lightwave systems of military and commercial aircraft and as a power booster for various lightwave test equipments.

We claim:

1. An optical fiber amplifier comprising: a first stage comprising:
   a first pump laser;
   a first wavelength division multiplexer for combining an optical input signal to said amplifier and the energy from said first pump laser;
   a first length of doped optical fiber for receiving the output of said first multiplexer;
   said length of said first doped optical fiber being sized and limited to achieve only small signal gain in an unsaturated regime; and
   a second stage comprising:
   a second pump laser;
   a second wavelength division multiplexer for combining the output of said first stage with the energy from said second pump laser; and
   a second length of doped optical fiber for receiving the output of said second multiplexer and producing an amplified output signal;
   said second stage being adapted to run into compression in its region of saturation thereby driving the overall optical fiber amplifier into a predetermined amount of gain saturation; and
   whereby said overall amplifier provides gain with a relatively low power consumption requirement.

2. Apparatus in accordance with claim 1, further comprising: means disposed in the output path of said first doped optical fiber for reducing backward-amplified spontaneous emission buildup and concurrently allowing propagation of the throughput signal and said amplified spontaneous emission in the forward direction, whereby the desired optical input signal and not said spontaneous emission is amplified.

3. Apparatus in accordance with claim 2, wherein said means is an optical isolator.

4. Apparatus in accordance with claim 3, further comprising: a filtering device for receiving the output of said isolator and reducing amplified spontaneous emission noise present in said isolator output.

5. Apparatus in accordance with claim 4, wherein said filtering device is a bandpass filter with a filter passband of substantially 10 nm.

6. Apparatus in accordance with claim 5, wherein said first stage and said second stage are co-directionally pumped with either 1480 nm or 980 nm light energy.

* * * * *